United States Patent [19]

Kellett et al.

[11] Patent Number: 4,579,306
[45] Date of Patent: Apr. 1, 1986

[54] TRANSMISSION WIRE CLAMP

[76] Inventors: K. Craige Kellett, R.R. #1, Minden, Ontario, Canada, K0M 2K0; E. Glenn Kellett, Box 914, Hamilton 5, Bermuda

[21] Appl. No.: 637,002

[22] Filed: Aug. 2, 1984

[51] Int. Cl.[4] .................................. F16L 3/08
[52] U.S. Cl. .................................. 248/74.1; 174/169
[58] Field of Search ............... 248/65, 74.1, 74.4, 248/68.1, 231.5, 316.5; 174/169; 411/900

[56] References Cited

U.S. PATENT DOCUMENTS

| 855,978 | 6/1907 | Rapke | 248/231.5 |
|---|---|---|---|
| 887,107 | 5/1908 | Locke | 174/169 |
| 1,735,192 | 11/1929 | Williams et al. | 248/74.1 |
| 1,895,156 | 1/1933 | Fisher | 248/316.5 |
| 2,502,892 | 4/1950 | Saylor | 411/900 X |
| 2,775,422 | 12/1956 | Herbulis et al. | 248/74.1 X |
| 3,267,206 | 8/1966 | Leonard | 174/169 |
| 3,357,664 | 12/1967 | Geyer | 248/74.4 |
| 3,383,739 | 5/1968 | Pitzel | 174/146 X |
| 3,437,742 | 4/1969 | Lindsey | 174/169 |
| 3,547,386 | 12/1970 | Clarke et al. | 248/74.1 X |
| 3,872,267 | 3/1975 | Kerr | 174/169 X |
| 3,899,149 | 8/1975 | Schneider | 248/74.1 X |

*Primary Examiner*—Ramon S. Britts
*Assistant Examiner*—David M. Purol
*Attorney, Agent, or Firm*—Ridout & Maybee

[57] ABSTRACT

A clamp is provided for holding an electrical transmission line at the end of an insulator on a transmission pole or tower. The clamp comprises an arm which may be pivoted over a transmission line seated in a saddle portion of the clamp body. The arm is locked in place to hold the line by means of a screw or bolt which engages the end thereof. The clamp is capable of remote manipulation by conventional live line tools thereby providing greatly increased safety over presently known devices.

5 Claims, 2 Drawing Figures

TRANSMISSION WIRE CLAMP

The present invention relates to a clamp for an electrical transmission line, and especially for a high power transmission line.

Conventionally electrical transmission lines are suspended from poles or transmission towers by means of clamps which require manual assembly at the site. Usually, the conventional clamp comprises a body member on which the line is placed, and a clamping arm which is fit over the seated line and bolted to the body thereby securing the line to the supporting structure. The operation of bolting the clamping arm to the body cannot be readily accomplished with conventional live line tools and requires the worker to manipulate the clamp with his gloved hands, or by extensive maneuvering with the live line tools. This situation presents obvious safety hazards to the worker, but heretofore there has not been available a clamp which can be simply operated through the use of conventional live line tools.

The present invention provides a clamp which can be easily manipulated through the use of conventional live line tools, thereby greatly reducing the hazards associated with this particular live line clamping procedure. The present clamp comprises a body having a socket for attachment to an electrical insulator, and a concavely curved saddle for receiving an electrical transmission line. A clamping arm is pivotally attached to the body and can pivot over the saddle to hold the line in place therein. The body has a slot for receiving the end of the clamping arm, and has a threaded aperture adjacent the slot through which a threaded locking member for holding the arm in place may be screwed.

A preferred embodiment of the invention will now be described with reference being made to the drawings in which.

Figure 1:
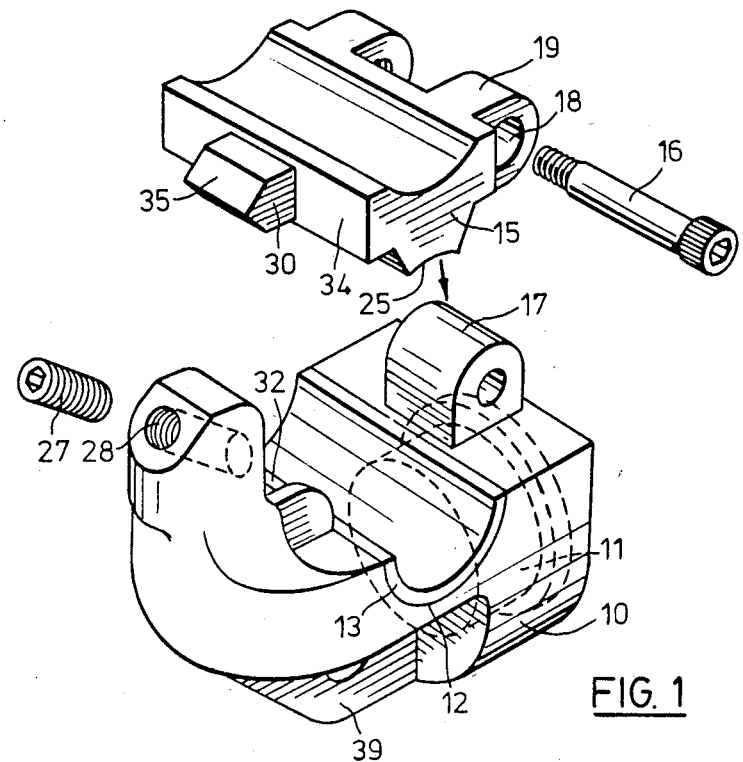
FIG. 1 is an exploded perspective view of the clamp.
Figure 2:
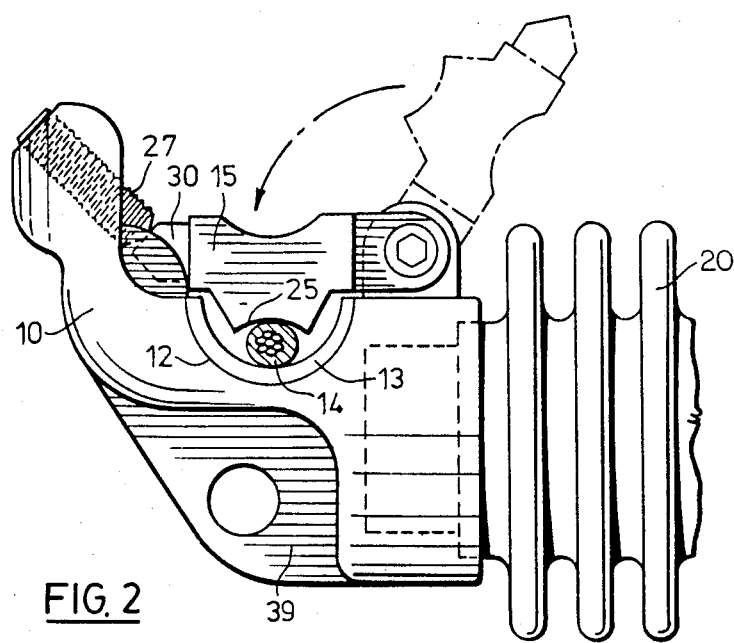
FIG. 2 is a side elevational view of the clamp positioned at the end of an insulator.

The preferred clamp comprises a body 10 having a socket 11 therein for attachment to an electrical insulator 20. The socket 11 may, of course, be shaped to fit various insulators commonly used in the trade. The preferred method of attachment of the body 10 as shown in the drawings to an insulator is by means of an adhesive, such as epoxy. However, it will be apparent to those skilled in this art that the body 10 may be adapted so that it might be attachable to an insulator in some other equally acceptable manner.

The body 10 is provided with a saddle 12 for receiving a transmission line 14. The saddle is concavely curved and may be conveniently semicircular. If the body is made from a metal, it is preferred to line the saddle 12 with a non-conductive material 13 such as rubber. For this purpose, a carbon impregnated rubber is generally preferred as this material has been found to adequately cut out radio interference especially caused by high power lines.

A clamping arm 15 is pivotally attached to the body 10 so that it may be pivoted over the saddle 12 to hold the line 14 in place. As shown in the drawings, the pivotal arrangement for the arm 15 may simply comprise a pin 16 inserted through a pin receiving member 17 on the body 10 and through holes 18 running transversely through the forked end 19 of the arm 15. As shown in FIG. 1 the holes 18 may be adapted to receive a threaded pin 16.

The arm 15 preferably has a concavely curved portion 25 positioned so as to engage the transmission line 14 seated in the saddle 12 when the arm 15 is pivoted thereover. The saddle 12 and curved arm portion 25 can thus cooperate to securely hold the line in place.

The arm 15 is secured in place over the saddle 12 by means of a threaded locking member 27 which is positioned by a threaded aperture 28 in the body 10 to engage the end 30 of the arm 15 remote from the forked end 19 when the end 30 is seated in a slot 32 formed in the body 10. As shown in FIG. 1 the arm 15 is shaped so that the end 30 comprises a relatively narrow member extending from the wider central portion 34 of the arm 15. This shape for the arm 15 is preferred, especially when used in association with the body 10 shaped as shown in the drawings, but other shapes for the arm 15 and body 10 incorporating the principles described herein would also be suitable in accordance with the invention.

A key feature of the present clamp is the use of the locking member 27 to hold down the arm 15 by engaging the end 30. The member 27 can be a bolt or screw and is preferably an allen screw. The aperture 28 is preferably situated at an angle of about 45° to the arm 15 in the closed position, and the end 30 is provided with a flat surface 35 angled to be capable of receiving the end of the member 27 such that the member 27 may be about normal to the surface 35 when fully engaged therewith.

Because the body 10 of the clamp as shown in the drawings is cut away in the area beneath the saddle 12 and threaded aperture 28, a reinforcing flange 39 is provided thereunder for structural strength. The clamp may be made of metal or other suitable material, and a preferred material is aluminum or an aluminum alloy.

It is also preferable to provide some means for preventing the threaded member 27 from backing out of the aperture 28 under the influence of normal line vibration and thereby causing the clamp to fail. One such suitable means comprises providing a portion of the thread on the member 27 with a nylon coating thereby making it a locking screw. In this regard, various locking screws are known which may be suitable for the present application. Other means for securing the member 27 in place to hold the arm 15 would be apparent to one skilled in the art.

In operation, the present clamp can be readily manipulated by conventional live line tools thereby greatly reducing the risk of the worker coming in contact with a high current source. Thus, the allen screw 27 is backed out by an allen key adapted live line tool so that the arm 15 is released. The arm 15 is pivoted by means of a live line tool so that a transmission line can be placed in the saddle 12. The arm 15 is then pivoted over the saddle 12 to engage the line at the curved portion 25 and the end 30 thereof is positioned in the slot 32. The arm 15 is secured in place by screwing down the allen screw 27 into contact with the surface 35.

I claim:

1. A clamp for an electrical transmission line, comprising:
    a body having a socket for attachment thereof to an electrical insulator, and a concavely curved saddle for receiving the transmission line;
    a clamping arm having opposite ends with one of said ends being pivotally attached to the body, wherein said arm is capable of pivoting over the saddle to clamp the transmission line in the saddle; and the body defining a slot for receiving the other end of the clamping arm, said body including a portion which extends above said clamping arm when it is in the clamped position, and a threaded aperture disposed within said portion of the body and having its lower end opening adjacent the slot through which a threaded locking member for holding the clamping arm in place is threadedly received, said other end of the arm being provided with a surface angled in alignment with said aperture and being substantially perpendicular to the axis thereof such that the locking member is oriented substantially normal to said surface when fully engaged therewith.

2. A clamp as claimed in claim 1, wherein the saddle is lined with a natural rubber.

3. A clamp as claimed in claim 1, wherein the clamping arm has a concavely curved surface for engaging the transmission line.

4. A clamp as claimed in claim 1, wherein the locking member has means associated with the thread thereof to prevent the member from backing out of the threaded aperture through vibration.

5. A clamp as claimed in claim 1, wherein the saddle is lined with a synthetic rubber.

* * * * *